US009044783B2

(12) United States Patent
Brown et al.

(10) Patent No.: US 9,044,783 B2
(45) Date of Patent: Jun. 2, 2015

(54) SYSTEM AND METHOD OF UNLOADING A CONTAINER OF ITEMS

(71) Applicant: United States Postal Service, Washington, DC (US)

(72) Inventors: John W. Brown, Manassas, VA (US); Edward F. Houston, Bristow, VA (US); Juan A. Roman, Fairfax, VA (US); Leung M. Shiu, Gaithersburg, MD (US); Riley H. Mayhall, Germantown, MD (US); William P. McConnell, Woodstock, MD (US); Matthew G. Good, Eldersburg, MD (US); Robert E. Hume, Woodstock, MD (US); Darin Dickey, Owings Mills, MD (US)

(73) Assignee: The United States Postal Service, Washington, DC (US)

( * ) Notice: Subject to any disclaimer, the term of this patent is extended or adjusted under 35 U.S.C. 154(b) by 231 days.

(21) Appl. No.: 13/797,731

(22) Filed: Mar. 12, 2013

(65) Prior Publication Data

US 2014/0271089 A1 Sep. 18, 2014

(51) Int. Cl.
*B65G 59/02* (2006.01)
*B07C 1/00* (2006.01)
(Continued)

(52) U.S. Cl.
CPC . *B07C 1/00* (2013.01); *B07C 1/025* (2013.01); *B65H 1/025* (2013.01); *B65H 1/263* (2013.01); *B65H 1/30* (2013.01); *B65H 2301/422542* (2013.01); *B65H 2301/422544* (2013.01); *B65H 2405/212* (2013.01); *B65H 2701/1916* (2013.01)

(58) Field of Classification Search
CPC ...... B65G 59/00; B65G 59/026; B65G 59/04; B65G 59/045; B65H 1/18; B65H 3/04; B65H 5/00; B65H 1/025; B65H 1/263; B65H 1/30; B65H 2301/422542; B65H 2301/422544; B65H 2405/212; B65H 2701/1916; B07C 1/04; B07C 1/00; B07C 1/025
USPC ............. 414/795.8, 797, 797.2, 797.6, 798.7, 414/795.7, 801; 271/2, 12, 96, 149, 275
See application file for complete search history.

(56) References Cited

U.S. PATENT DOCUMENTS 3,485,488 A 12/1969 Ellison
3,649,002 A 3/1972 Burkhardt
(Continued)

OTHER PUBLICATIONS

The International Search Report and Written Opinion mailed Sep. 9, 2014 for International Patent Application No. PCT/US 14/23300, which claims priority from captioned U.S. Appl. No. 13/797,731, and cites the above-identified references numbered 1-9.
(Continued)

*Primary Examiner* — Saul Rodriguez
*Assistant Examiner* — Lynn Schwenning
(74) *Attorney, Agent, or Firm* — Knobbe Martens Olson & Bear LLP

(57) ABSTRACT

Embodiments of a system and method for unloading articles from a container of items for use in an automatic stack feeder are disclosed. The automatic stack feeder may comprise a belt, a moveable lower paddle, and a moveable upper paddle, wherein the lower paddle is configured to partially extend through a belt of the automatic stack feeder. The movement of the belt, the lower paddle, and the upper paddle are coordinated such that there is no need to interrupt the operation of the automatic stack feeder to unload the container.

22 Claims, 12 Drawing Sheets

(51) Int. Cl.

| | |
|---|---|
| ***B07C 1/02*** | (2006.01) |
| ***B65H 1/02*** | (2006.01) |
| ***B65H 1/26*** | (2006.01) |
| ***B65H 1/30*** | (2006.01) |

(56) References Cited

U.S. PATENT DOCUMENTS

| | | | | |
|---|---|---|---|---|
| 4,257,587 | A | 3/1981 | Smith | |
| 4,595,188 | A | 6/1986 | Wiley et al. | |
| 5,064,341 | A | 11/1991 | Pippin | |
| 5,165,675 | A | 11/1992 | Kanaya | |
| 5,409,204 | A | 4/1995 | Strohmeyer et al. | |
| 5,755,437 | A | 5/1998 | Ek | |
| 5,829,742 | A | 11/1998 | Rabindran et al. | |
| 5,893,701 | A * | 4/1999 | Pruett | 414/798.2 |
| 5,947,468 | A * | 9/1999 | McKee et al. | 271/210 |
| 5,992,610 | A | 11/1999 | Dufour et al. | |
| 6,276,586 | B1 | 8/2001 | Yeo et al. | |
| 6,679,491 | B2 | 1/2004 | Luebben et al. | |
| 6,715,755 | B2 | 4/2004 | Sussmeier | |
| 7,025,347 | B2 | 4/2006 | Masui et al. | |
| 7,195,236 | B2 * | 3/2007 | Hillerich et al. | 271/2 |
| 7,537,207 | B2 | 5/2009 | Kutzer et al. | |
| 7,552,918 | B2 | 6/2009 | Blackwell et al. | |
| 7,703,769 | B2 | 4/2010 | Schwarzbauer | |
| 7,712,735 | B2 | 5/2010 | Chorier-Pichon et al. | |
| 2002/0011703 | A1 | 1/2002 | Tomiyama et al. | |
| 2002/0153654 | A1 * | 10/2002 | Blackwell et al. | 271/96 |
| 2006/0087068 | A1 | 4/2006 | Bittenbender et al. | |
| 2007/0085259 | A1 | 4/2007 | Grogor et al. | |
| 2007/0252321 | A1 | 11/2007 | Kutzer et al. | |
| 2010/0032889 | A1 | 2/2010 | Krause et al. | |
| 2010/0038840 | A1 | 2/2010 | Watanabe et al. | |
| 2010/0258407 | A1 | 10/2010 | Krause et al. | |
| 2010/0329833 | A1 | 12/2010 | Ambroise et al. | |
| 2011/0278785 | A1 | 11/2011 | Franzone et al. | |
| 2012/0013064 | A1 | 1/2012 | Samain et al. | |

OTHER PUBLICATIONS

U.S. Office Action dated Sep. 25, 2014 for U.S. Appl. No. 13/801,749, which is related to captioned U.S. Appl. No. 13/797,731, and cites the above-identified references numbered 10-18.

* cited by examiner

SYSTEM AND METHOD OF UNLOADING A CONTAINER OF ITEMS

BACKGROUND

1. Field of the Invention

This disclosure relates to the field of automatic feeding and sorting of items or articles. More specifically, the present disclosure relates to the automated singulation of articles obtained from a container.

2. Description of the Related Art

Articles, such as items of mail, are frequently provided in bulk and must be sorted into individual articles or items for processing or routing. If the stack of articles in the feeder is not positioned correctly, or if it slumps, the singulation process for sorting individual articles may be slowed down or hampered with errors, such as picking more than one article at a time. Articles are often provided in bulk containers, whose contents or fullness can be difficult to predict. As containers are unloaded onto a sorting apparatus, the articles both on the sorting apparatus and in the container may slump, or fall into a position which is not ideal for singulation.

SUMMARY

To be added when claims are finalized.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1A:
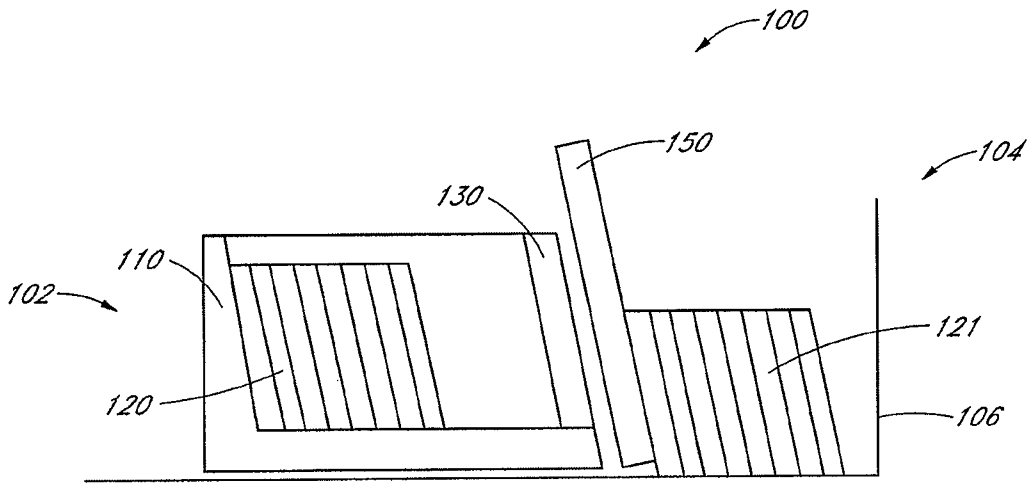
FIG. 1A PRIOR ART
FIG. 1A is a side elevation view of a container having a closed door.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

As used herein, the term singulation may mean the separation of a stack of articles into single articles that move into a sorting or picking machine in a line of single articles. The term shingulation may mean the separation of articles from a bulk stack, but wherein the articles are not entirely segregated from the other articles of the stack. Shingulated articles partially overlap each other, similar to the overlapping pattern of shingles on a roof, and move into a sorting or picking machine in an overlapping, continuous line of articles. As used herein, a singulator may be capable of both singulation and shingulation a stack of articles; the use of the term singulator is used to describe both processes for convenience and ease of description. The term motor is used herein to refer to any device which provides a mechanical or electrical motive force to a component of the automatic high speed flats feeder. The motors described herein may be mechanically or electrically driven, or may be a source of pneumatic or hydraulic pressure, or may be any other type of motors.

The system described herein provides for faster and more efficient unloading of containers holding stacks of articles intended for separation, singulation, or shingulation of bulk articles, such as, for example, articles of mail. Articles such as mail comprising magazines and catalogs, which are too long in one direction to be considered a standard sized letter, are often called flats. Flats are often flexible and may sometimes be flimsy, which can cause problems in automatic stack feeders during singulation or shingulation. These articles or flats may be processed as a stack. As used herein, the term stack may refer to a single article or to one or more articles grouped together, and the term may be used in an automatic stack feeder. Although the present disclosure describes systems and devices for sorting and/or singulating articles of mail, catalogs, and magazines, it will be apparent to one of skill in the art that the disclosure presented herein is not limited thereto. Articles or flats may be provided in containers which must be unloaded onto automatic stack feeders for singulation. In order to ensure proper singulation or shingulation, proper stack pressure must be maintained throughout the container unloading process. The embodiments described herein provide for a system and method of ensuring sufficient stack pressure is maintained while unloading articles from a container.

As used herein, the terms horizontally and vertically are used with reference to the general layout of an automatic stack feeder. The horizontal direction refers to the direction which is generally parallel to the surface on which the automatic stack feeder sits in its normal configuration (e.g., the floor or ground). The horizontal direction is also referred to as the x-axis. A direction or movement described as being in the vertical direction is in a direction that is generally perpendicular to the horizontal direction, but need not be exactly perpendicular to the horizontal direction. The vertical direction may be one that extends generally away from the horizontal surface of the automatic stack feeder, as will be described more fully herein. The vertical direction is also referred to as the z-axis.

Figure 1B:
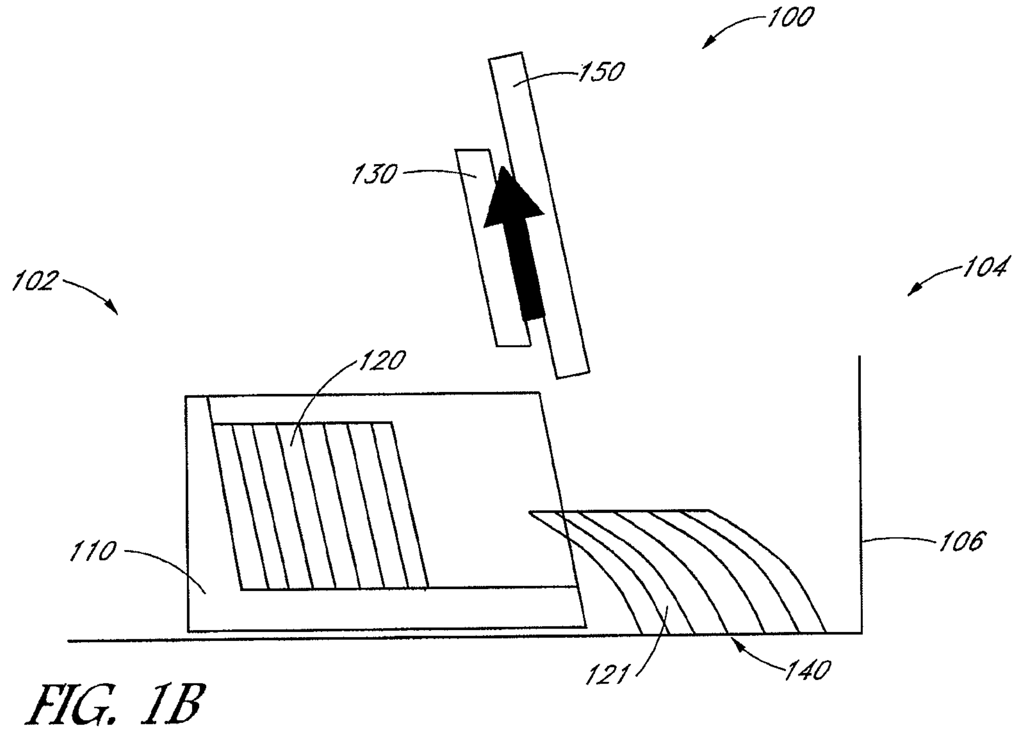
FIG. 1B PRIOR ART
FIG. 1B is a side elevation view of the container of FIG. 1A having an open door.

FIGS. 1A and 1B illustrate a system and method of unloading bulk articles from containers. FIGS. 1A and 1B are provided to illustrate one option for unloading containers onto a singulation apparatus or of the process of unloading containers for use in an automatic stack feeder. This description should in no way be construed as limiting any of the disclosure contained herein, but is provided merely as one example of unloading containers in automatic stack feeder technology.

Referring to FIG. 1A, an automatic stack feeder 100 is depicted. The automatic stack feeder 100 comprises a first end 102 and a second end 104, and a belt 140. The second end 104 comprises a singulator 106. The automatic stack feeder 100 has a paddle 150 which supports a first stack of articles 121, providing sufficient stack pressure for proper singulation or shingulation of the first stack of articles 121. Stack pressure is defined as the pressure exerted by the stack on the singulator 106. If stack pressure is not properly maintained, the stack may slump, or fall forward or backward, which hampers singulation and shingulation. Maintaining proper stack pressure ensures a sufficient surface area of the lead article in a stack makes contact with the singulator 106 to ensure efficient and accurate singulation or shingulation of the stack. In the automatic stack feeder 100, the belt 140 moves the first stack of articles 121 toward the singulator 106, and the paddle 150 provides vertical support, and moves with the first stack of articles 121 to maintain the stack pressure. If the first stack of articles 121 is not maintained with sufficient pressure on the singulator 106, the first stack of articles 121 may begin to slump or fall, which hinders efficient singulation or shingulation.

As the belt 140 moves the first stack of articles 121 toward the singulator 106, a container 110 is received in a carrier (not shown), which moves the container 110 into a position behind the first stack of articles 121. The container 110 has a door 130 which is positioned behind the paddle 150. The container 150 contains a second stack of articles 120. As depicted in FIG. 1A, the door 130 is closed when the container 150 is first positioned above the belt 140.

FIG. 1B depicts the automatic stack feeder 100 wherein the door 130 of the container 110 has been opened. The paddle 150 opens the door 130 by vertically removing the door 130 from the container 110. Paddle 150 must move in the vertical direction along with the door 130 in order to allow the second stack of articles 120 a path to exit the container 110. When the door 130 is opened, and the paddle 150 moves in a vertical direction away from the first stack of articles 121, the first stack of articles 121 loses vertical support, and the first stack of articles 121 may slump or fall into the container 110, as depicted, and thus, sufficient stack pressure is not maintained. The operation of paddle 150 will be described in greater detail below with reference to FIG. 2.

Figure 2:
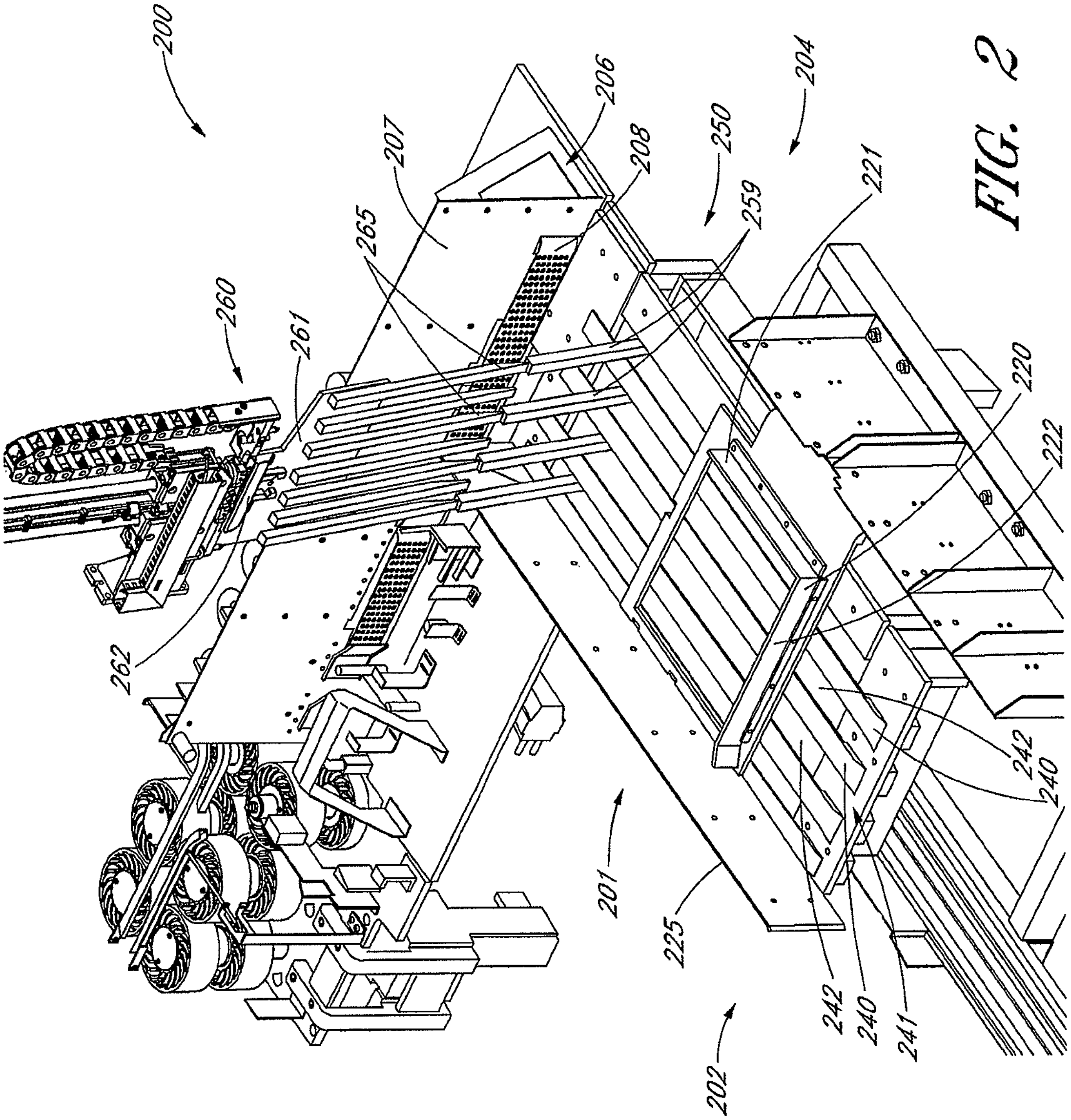
FIG. 2 is a perspective view of one embodiment of a singulation apparatus.

FIG. 2 depicts a perspective view of an embodiment of an automatic stack feeder 200 configured to ensure sufficient stack pressure is maintained throughout the container unloading process, which does not suffer from the shortcomings of the embodiment described with respect to FIGS. 1A and 1B. The automatic stack feeder 200 comprises a frame 201, a plurality of belts 240, a lower paddle assembly 250 and an upper paddle assembly 260.

The frame 201 provides support for the belts 240 and the lower paddle 250. Generally, the frame 120 is roughly table shaped, being elevated off the ground by a plurality of legs (not shown) or by other means known in the art. The frame 201 has a first end 202 and a second end 204. The frame 201 comprises a singulator 206 connected at the second end 204 of the frame 201. The singulator 206 comprises a vertical portion 207 which is mounted at a right angle to the generally flat horizontal surface of the frame 201. The singulator 206 may be attached directly to a flat surface at the second end 204 of the frame 201. In some embodiments, the singulator 206 may be disposed in close proximity to the second end 204 of the frame 201 and within the vertical portion 207 such that the second end 204 of the frame 201 is located near or in contact with the singulator 206. The major plane surface of the singulator 206 is disposed generally vertically, at a right angle to the generally horizontal plane of the frame 201. The singulator 206 comprises a singulation belt 208 with perforations disposed therein such that air flow is possible through the singulation belt 208, while the belt maintains its structural integrity. A vacuum force is applied through the perforations in the belt of the singulator 206, so that as articles located on the belts 240 are moved forward into contact with the singulation belt 208 as the vacuum force acts on the adjacent article's surface. The vacuum force applied through the singulation belt 208 is sufficient to attract the lead article in a stack of articles, and maintain the lead article in position against the singulation belt 208. The singulator 206 may be disposed within the vertical portion 207 such that a surface of the singulation belt 208 is aligned in the same plane as a surface of the vertical portion 207. The process of singulation is described in more detail in U.S. patent application Ser. No. 13/797,291, filed Mar. 12, 2013, the contents of which are herein incorporated by reference in their entirety. Frame 201 also comprises a stack guide 225, attached on one side of the frame, and extending parallel to and alongside the belts 240. which has a smooth vertical surface provided to align and guide articles, items, or the container 110 when placed on the belts 240.

The belts 240 are continuous loops disposed on rollers (not shown), located near the first end 202 and the second end 204 of the frame 201, and which are rotatably attached to the frame 201. The rollers are attached to a motor and are configured to rotate, thus causing the belts 240 to move like a standard conveyor belt. The belts 240 are generally aligned parallel to each other and are separated by a distance, as shown in FIG. 2. The belts 240 run lengthwise along the automatic stack feeder 200 from the first end 202 to the second end 204. Thus, there may be openings 242 between the belts 240 corresponding to the space between the belts 240. The belts 240 can be, for example, independently driven, or driven together. Top surfaces 241 of the belts 240 are disposed within the same plane as the generally horizontal flat surface of the frame 201.

The upper paddle assembly 260 comprises an upper paddle 261 and upper tines 265 which are secured to the upper paddle 261 at their upper portion, and the lower portions of which extend downward beyond the upper paddle 261, and toward the generally flat, horizontal surface of the frame 201. The upper paddle assembly 260 is connected to a track, cable, rail, or drive belt, which is in turn, connected to an x-axis motor (not shown), all of which are disposed above the generally flat, horizontal surface of the frame 201. As the motor operates, the track or drive belt moves, which, in turn, moves the upper paddle assembly 260. The motor is configured to move the upper paddle assembly 260 in a horizontal direction toward or away from the second end 204 of the frame 201. The upper paddle assembly 260 is moveable along the length of the frame 201.

The upper paddle assembly 260 is also moveable such that the vertical position of the upper paddle 261 and the upper tines 265 is adjustable. The upper paddle assembly 260 is connected to a z-axis motor via a slidable track, rail, or guide (not shown), that can move the upper paddle assembly 260, including the upper paddle 261 and the upper tines 265 toward or away from the top surfaces 241 of the belts 240. The upper paddle 260 assembly is disposed such that the upper paddle 261 and the tines upper tines 265 are disposed at an angle relative the belts 240. The z-axis motor connected to the upper paddle assembly 260 is configured to extend the upper paddle 261 downward toward the top surfaces 241 of the belts 240, so that the upper tines 265 are positioned to provide vertical support for a stack of articles located on the belts 240. The z-axis motor connected to the upper paddle 260 and upper tines 265 is also configured to move the upper paddle 261 assembly upward away from the surface of the belts 240, so that the upper tines 265 are in position which will not interfere with the movement of a stack of articles located on the belts 240.

A door opener 262 is connected to a rearward facing portion of the upper paddle assembly 260. The door opener 262 comprises a hook, latch, or other similar device capable of releasably engaging a door of a container and opening or removing the door. The door opener 262 is connected to the upper paddle assembly 260 via a moveable connection which is driven by a z-axis motor and a gear, cable, cord, pneumatic or hydraulic piston, or any other desired mechanism. The door opener 262 is vertically moveable such that the door opener 262 may extends below the upper paddle 261 to engage a latch, hook, or receiver in the door 230 of a container 210, and then retracts the door 230 vertically, thereby opening the container 210.

Frame 201 also provides support for a carrier 220. The carrier 220 is attached on one side to a moveable linear guide (not shown) which runs parallel to the frame 201 and the belts 240, opposite the stack guide 225. The carrier 220 comprises a first surface 221 parallel to the belts 240 and a second surface 222 which is generally vertical and which is disposed perpendicular to the belts 240. The carrier 220 is attached to the frame 201 such that the carrier 220 does not make contact with the belts 240. The carrier 220 is configured to receive a container 210. The container 210 rests on the first surface 221 and abuts the second surface 222 on a rear surface of the container 210. In this way, the container can be moved back and forth along the frame 201 by the carrier 220, independent of the movement of the belts 240.

Figure 3A:
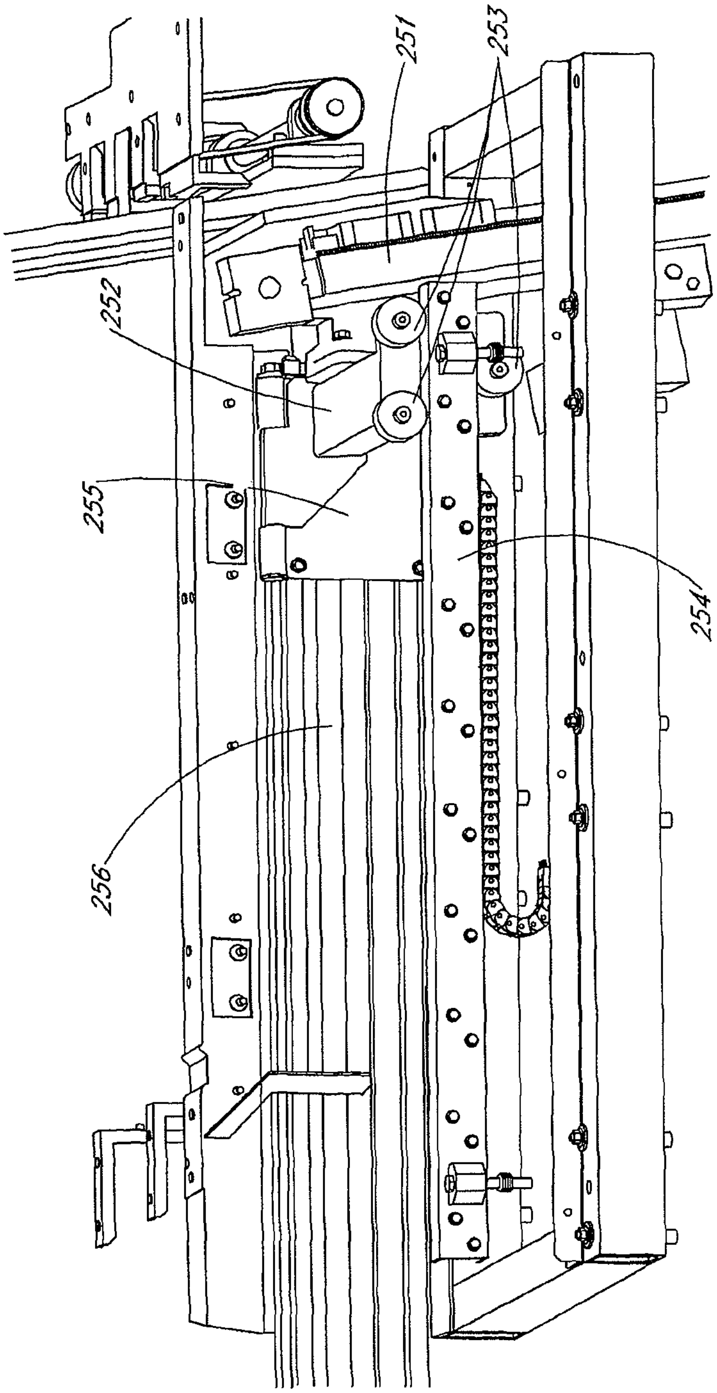
FIG. 3A is a perspective view of the lower paddle assembly of the singulation apparatus of FIG. 2.

FIG. 3A depicts a perspective view of an embodiment of the lower paddle assembly 250. The lower paddle assembly 250 comprises a support member 251 which is connected to a cross member 252. Cross member 252 comprises rollers 253 disposed at one end, and is connected to the drive connector 255 at the other end. The rollers 253 moveably engage a rail 254, which is connected to the frame 201 and extend parallel to and below the belts 240. The drive connector 255 moveably engages a drive member 256. The drive member 256 is supported by the frame 201. In some embodiments, the drive member 256 may be a belt, a track, a cable, a gear, a pneumatic or hydraulic piston, or other similar device to which the drive connector 255 may moveably connect. The drive member 256 is, in turn, attached to an x-axis motor (not shown). As the x-axis motor operates, the drive member 256 is moved along the track, belt, gear, cable, etc., which, in turn, moves the whole lower paddle assembly 250 in the horizontal direction parallel to the path of the belts 240. The lower paddle assembly 250 is moveable along the length of the frame 201.

Figure 3B:
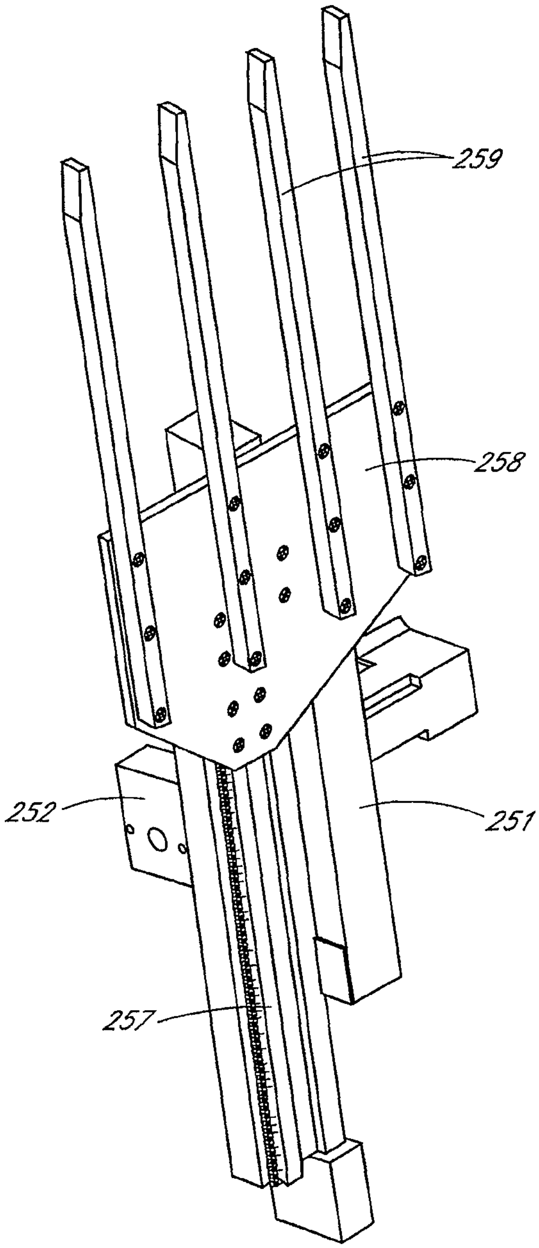
FIG. 3B is a perspective view of the z-axis component of the lower paddle assembly of the singulation apparatus of FIG. 3A.

As depicted in FIG. 3B, the lower paddle assembly 250 further comprises a z-axis member 257 which is moveably connected to the support member 251. The z-axis member 257 may be moveably connected to the support member 251 using a track, cable, gear, piston, or other similar connection method. The z-axis member is moveably attached to the support member 251 and to a z-axis motor (not shown) configured to move the z-axis member 257 up and down, along the z-axis, in relation to the horizontal surface of the frame 201. A lower paddle 258 is attached to the z-axis member, and one or more lower tines 259 are attached to and extend upward from the lower paddle 258.

Figure 3C:
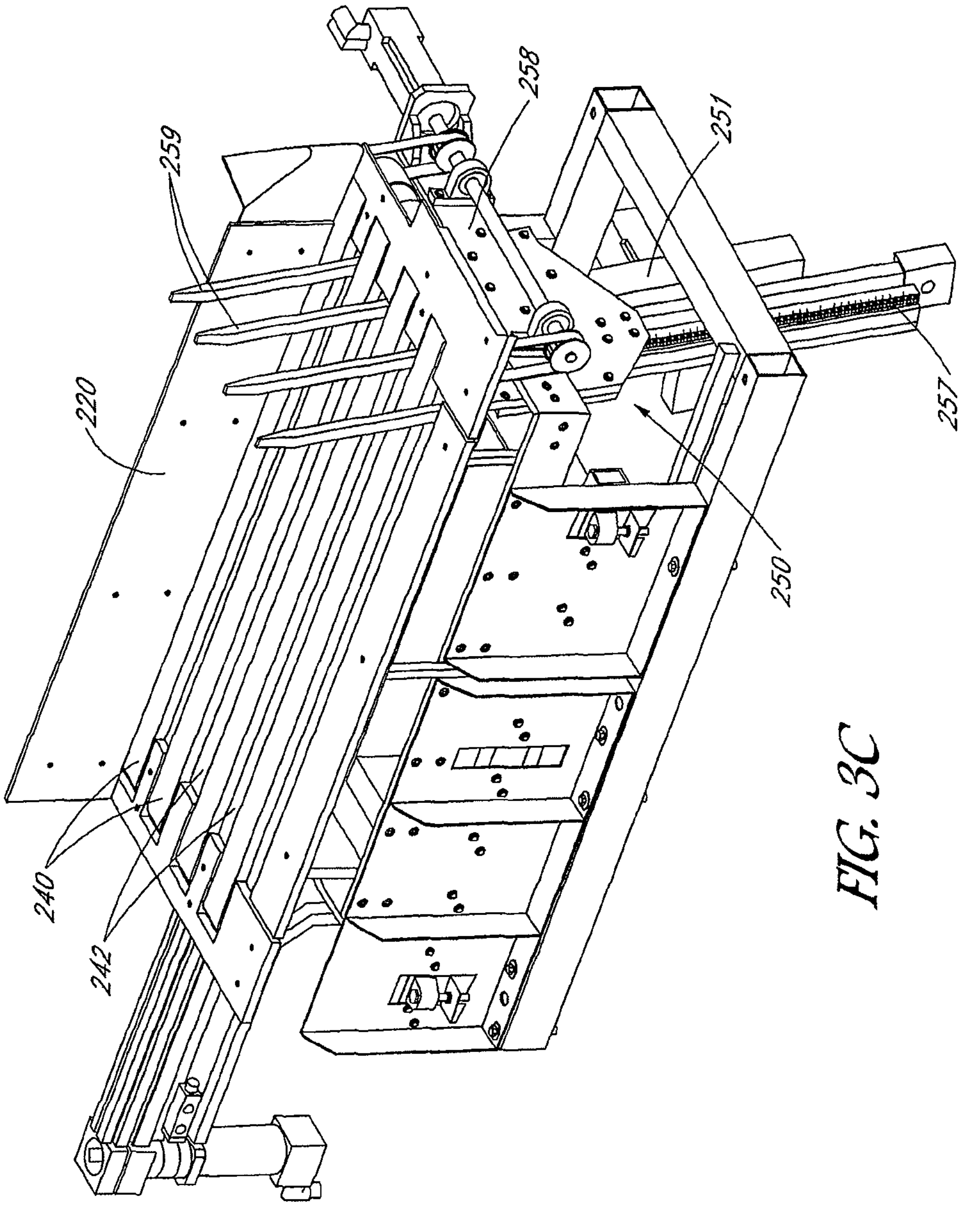
FIG. 3C is a perspective view of the lower paddle assembly and the conveyor of the singulation apparatus of FIG. 3A.

FIG. 3C depicts the lower paddle assembly 250 positioned within the frame 201. As depicted, the lower paddle assembly 250 is generally disposed below the plane of the horizontal surface of the frame 201. The lower tines 259 protrude upward through the spaces or openings 242 between or around the belts 240.

As described above, the lower paddle assembly 250 is moveable in a horizontal or x-axis direction. In other words, the lower paddle assembly is moveable horizontally between the first end 202 and the second end 204 of the frame 201. To move the lower paddle assembly 250 from the first end 202 to the second end 204, or from the second end 204 to the first end 202, the x-axis motor is operated. The operation of the x-axis motor moves the drive member 256, (e.g., a drive belt, a track, a gear, or other similar device) to which the drive connector 255, is attached. Therefore, as the motor operates, the drive connector 255 moves between the first end 202 and the second end 204 of the frame 201. Whereas the drive connector 255 is attached to the support member 251, the z-axis member 257, the lower paddle 258, and the lower tines 259 all move together in a horizontal direction as the motor operates. The motor is connected and configured to move the lower paddle assembly 250 in a direction toward or away from the second end 204 of the frame 201. Thus, the lower paddle assembly 250 is moveable along the length of the frame 201. The frame 201 has voids or spaces in its surface corresponding to openings 242, disposed in the areas around or between the belts 240. The lower tines 255 are aligned with the openings 242, and the tines 255 can move within the openings 242, along the length of the frame 201, as the lower paddle assembly 250 moves. Generally, the lower paddle assembly 250 is moveable along the length of frame 201 in order to provide support to a stack of articles (not shown) and maintain sufficient stack pressure to ensure proper singulation or shingulation.

In addition to horizontal movement, the lower paddle 258 and the lower tines 259 are moveable in a vertical direction as the z-axis motor operates. The z-axis member 257 is connected to the support member 251 such that the z-axis member can vertically move, using a track, cable, belt, gear, pneumatic or hydraulic piston, or other similar device, as described herein. As the z-axis motor operates, z-axis member 257 moves along the support member 251, thus causing vertical motion of the lower paddle 258 and the lower tines 259. The z-axis member 257 is sized and is connected to the support member 251 at a location which enables the lower tines 259 to be disposed entirely below the horizontal surface of the frame 201 at the first extent of operation, and to enable the lower tines 259 vertically to protrude through the openings 242 sufficiently to allow the lower tines to provide front or back support to a stack of articles on the top surfaces 241 of belts 240.

The vertical movement of the z-axis member 251 need not be perpendicular to the horizontal surface of the frame 201. As described above, the term vertical is used to denote a direction generally perpendicular, but not necessarily exactly perpendicular, to the horizontal movement, or x-axis, of the lower paddle assembly 250. In some embodiments, the z-axis member 251 may be connected to the support member 251 such that the z-axis member 257 and the lower paddle 258 are disposed at an angle other than a right angle to the horizontal surface of the frame 201. For example, in some embodiments, the z-axis member 257 may be connected to the support member 251 to form an angle θ with a surface of the belt or belts 240. In some embodiments, the angle θ may greater than 90°, such as, 91°, 92°, 93°, 94°, 95°, 100°, 110°, or more, or any angle therebetween. In some embodiments, the z-axis member 257, and therefore the lower paddle 258, move such that the angle θ is maintained constant.

During operation of the automatic stack feeder 200, a stack of articles (not shown) is disposed on the belts 240, and is supported on its rear facing side by either the upper tines 265, the lower tines 259, or both. The upper paddle 260 and the lower paddle 258 are moveable independent of each other and independent of the belts 240. The belts 240 are configured to move the stack of articles either toward or away from the singulator 206, as required. Generally, the belts 240 advance the stack of articles toward the singulator 206 such that the lead article of the stack impinges on the singulator 206. As the stack of articles is advanced toward the singulator 206 by the belts 240, the upper paddle 260 or the lower paddle 258 moves along with the stack in order to maintain vertical support and the stack pressure of the stack of articles against the adjacent face of the singulator 206.

The stack of articles may be made of a variety of articles or items. For example, the stack of articles may be made up of magazines, catalogs, mail, containers, tiles, boards, stackable components or materials, or other articles that are desired to be singulated or shingulated. In some embodiments of the automatic static feeder 200, the stack of articles can be positioned such that some articles in the stack of articles are closer to the singulator 206 than other articles. Thus, the stack may comprises a leading article, which is the article in the stack located closest to the singulator 206.

Figure 4:
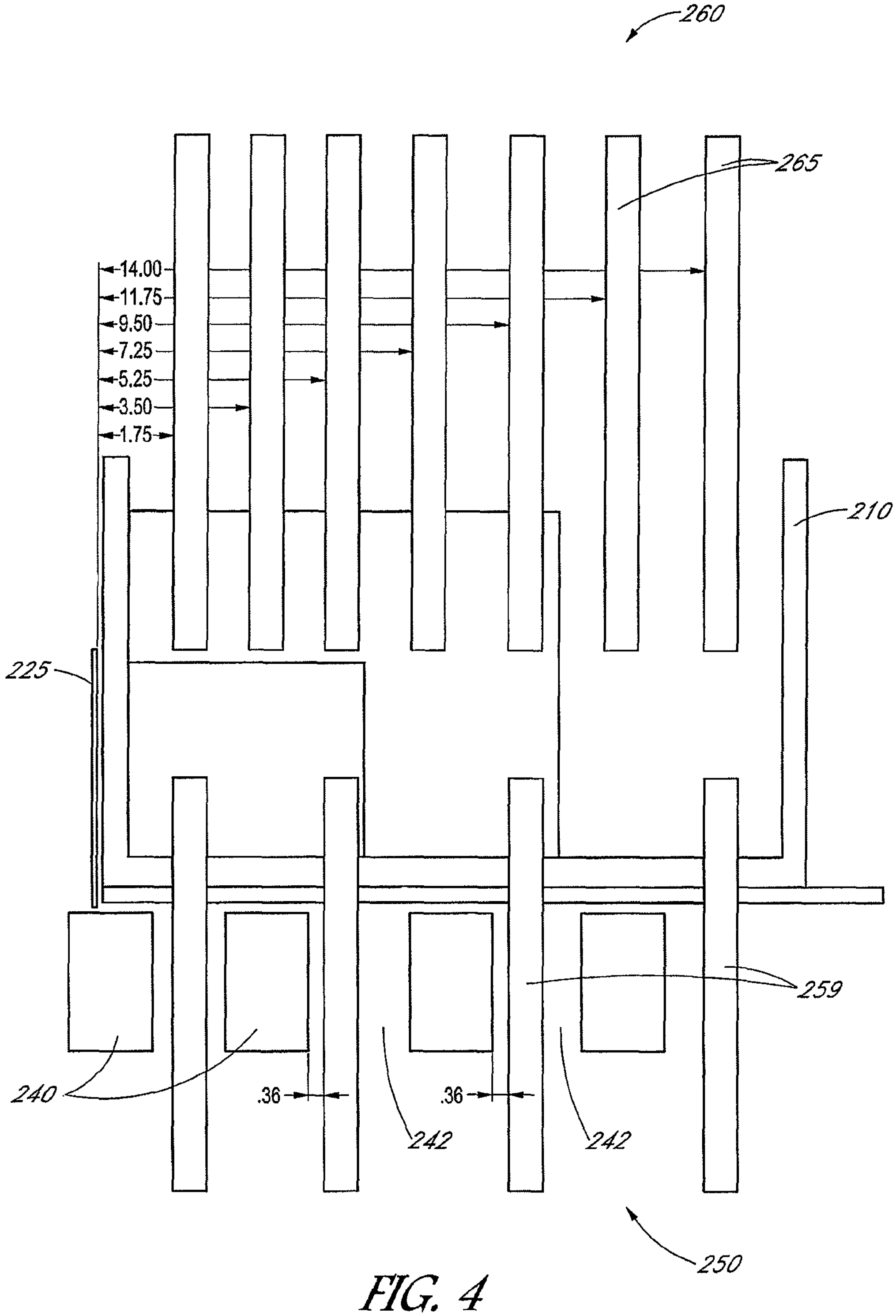
FIG. 4 is a front elevation view of the upper and lower paddles of one embodiment of a singulation apparatus.

FIG. 4A depicts a side elevation view of the lower tines 259 of the lower paddle 258 and the upper tines 265 of the upper paddle 260. As depicted, the lower tines 259 and upper tines 265 are configured and sized such that when the container 210 is placed on the carrier 220, flush against the stack guide 225, the upper tines 265 do not extend beyond the sides of the container 210 and/or the stack guide 225, as depicted. In some embodiments, one or more of the lower tines 259 may be vertically aligned with a corresponding one or more of the upper tines 265, as depicted. In some embodiments, the lower tines 259 and the upper tines 265 of the upper paddle 260 may be disposed such that the lower tines 259 and the upper tines 265 are offset from each other so as to mesh, with the lower tines aligned with the spaces between the upper tines 265. In some embodiments, as the lower paddle 258 and the upper paddle 260 move toward each other, the lower tines 259 and the upper tines 265 do not contact each other.

Figure 5:
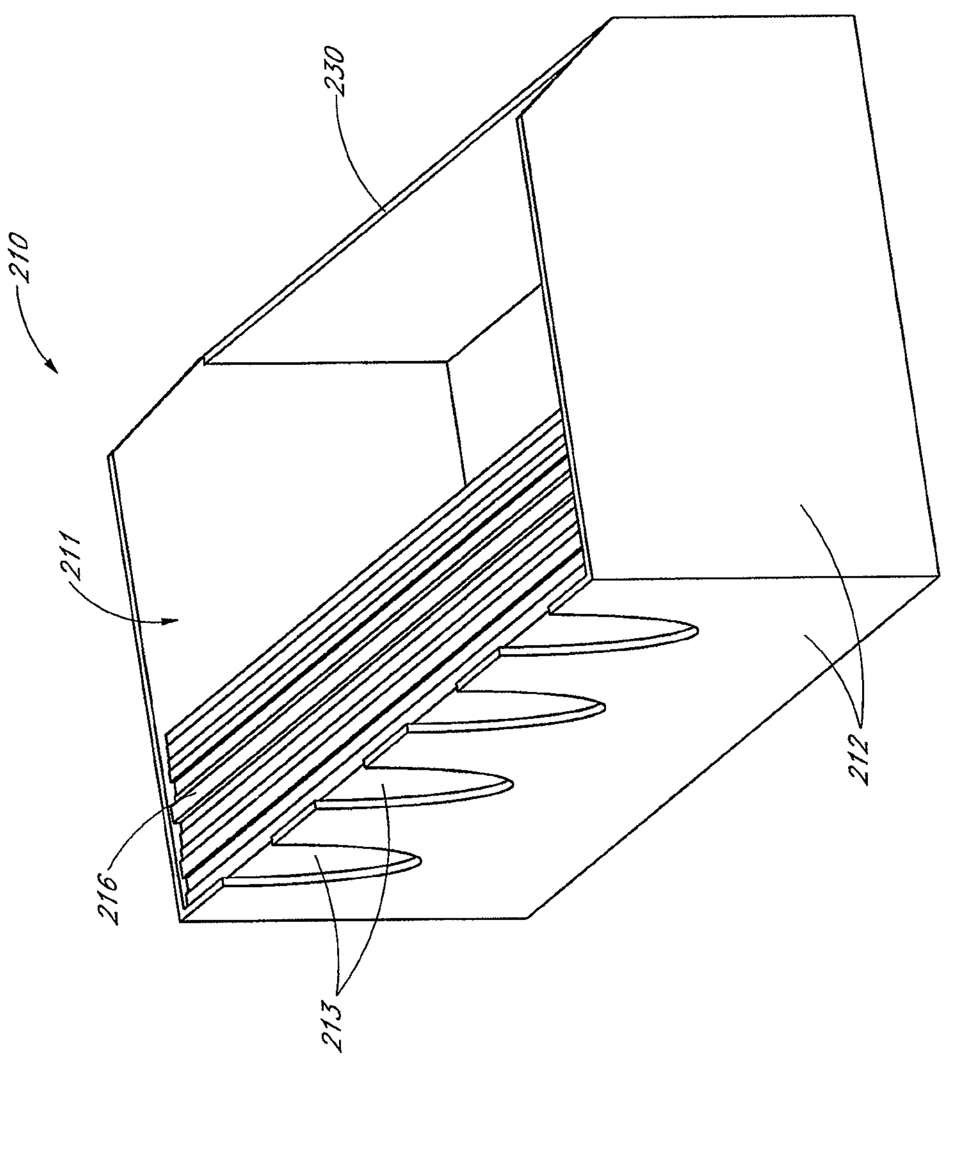
FIG. 5 is a perspective view of one embodiment of a container used in an automatic stack feeder.

FIG. 5 depicts a perspective view of an embodiment of the container 210. The container 210 comprises an open top 211, a plurality of sides 212, a bottom, and the door 230, which together enclose a second stack of articles 216. In some embodiments, the container may have an enclosed top having perforations or slots (not shown) disposed therein corresponding to the locations of the upper tines 265. The perforations or slots in the top of the container 230 allow the upper tines 265 to be inserted into the container 230. The door 230 is disposed on one side of the container 210. The door 230 is a vertically removable piece. In some embodiments, the door 230 has a ridge, lip, or other protrusion disposed on at least two edges of the door 230 which are removably held within corresponding slots, grooves, or other indentations in the sides 212 of the container 210.

One of the sides 212, specifically, the side 212 which is opposite door 230, has grooves or notches 213 disposed in the side, which extend vertically downward from the top of the container 210. The grooves or notches 213 do not extend the entire vertical length of the side 212 in which they are disposed. The notches are sized and positioned to align with the upper tines 265 such that the upper tines 265 can move through the grooves or notches 213, and contact the second stack of articles 216 disposed within the container 216.

Figure 6:
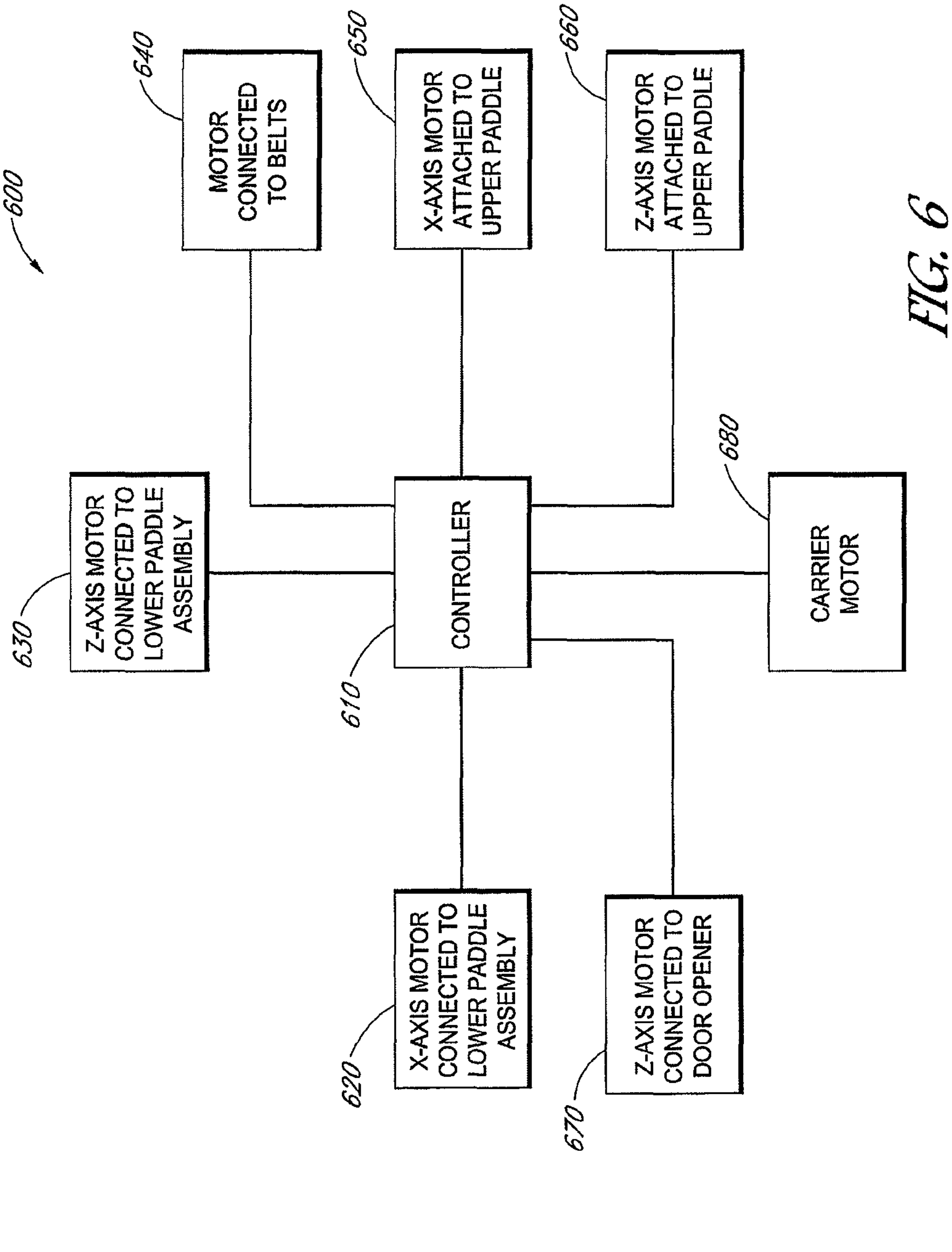
FIG. 6 is a schematic diagram of a controller's connections to components of the automatic stack feeder.

FIG. 6 depicts a schematic diagram of a controller and its connections to various components of the automatic stack feeder 200. The automatic stack feeder 200 may comprise an automatic control system 600 under the direction of a processor-based controller 610. The controller may be controllably connected to the x-axis and z-axis motors described herein. The connections of controller 610 to the various motors described herein may be an electrical connection, either wired or wireless, or any other desired type of connection configured to send control signals to the various components, and to receive signals from the various components. The controller 610 is connected to the lower paddle assembly x-axis motor 620, lower paddle assembly z-axis motor 630, the belt motor 640, the upper paddle x-axis motor 650, the upper paddle z-axis motor 660, the door opener motor 670, and the carrier motor 680. The controller is configured to coordinate the various components and motors of the automatic stack feeder 200 to accomplish the unloading of the container 210 as will be described with reference to FIGS. 7A-D.

Figure 7A:
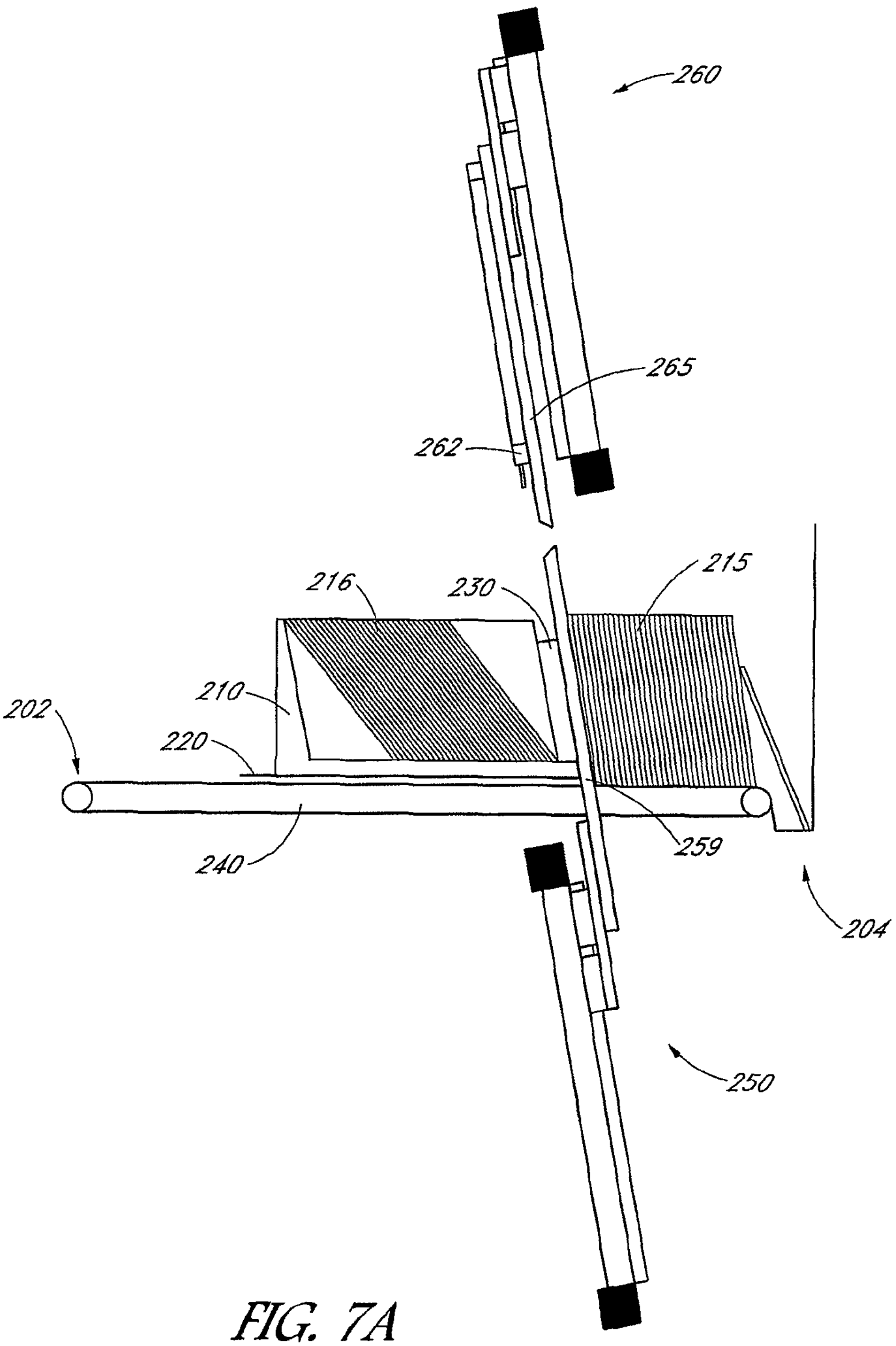
FIGS. 7A-D are perspective views of a singulation apparatus depicting a sequence for unloading a container using an upper and lower paddle of the singulation device.

FIGS. 7A-7D depict a side view of the stages of a container unloading process, illustrating the movements and positions of the upper paddle 265 and the lower paddle 259 during an unloading process of the container 210. As depicted in FIG. 7A, the automatic stack feeder 200 may hold a first stack of articles 215 on the belts 240 while those articles are undergoing singulation or shingulation at the singulator 206. During singulation or shingulation, the articles may be supported along their rearward face by either the lower tines 259 or the upper tines 265. As the articles are singulated or shingulated at the singulator 206, the upper tines 265 or lower tines 259, whichever are supporting the first stack of articles 215, support the first stack of articles 215 as the first stack of articles 215 moves toward the singulator 206. The first stack of articles 215 may be moved toward the singulator 206 by the movement of the belts 240.

Referring to FIG. 7A, prior to placing the container 210 onto carrier 220 in the automatic stack feeder 200, the z-axis member 257 is extended vertically such that the lower tines 259 protrude vertically through openings 242 between the belts 240. The lower tines 259 support the first stack of articles 215 and move with the belts 240, toward the singulator 206, in order to maintain stack pressure. The x-axis motor 620 operates under the direction of the controller 610. In some embodiments, the controller 610 coordinates the movement of the x-axis motor 620 with the belts motor 640, in order to maintain stack pressure between the first stack of articles 215 and the lower tines 259, as the first stack of articles 215 moves toward the singulator 206. The controller 610 also coordinates the movement of the belt 240 and the lower paddle assembly 250 such that the first stack of articles 215 is maintained at approximately the same angle relative to the belts 240 as the first stack of articles 215 moves toward the singulator 206.

The container 210 is placed onto the carrier 220, and the carrier 220 positions the container 210 at or near the first end 202 of the frame 201 such that the first stack of articles 215 is disposed between the container 210 and the singulator 206.

Once placed on the carrier 220, the container 210 is moveable toward or away from the first stack by the carrier 220.

Figure 7B:
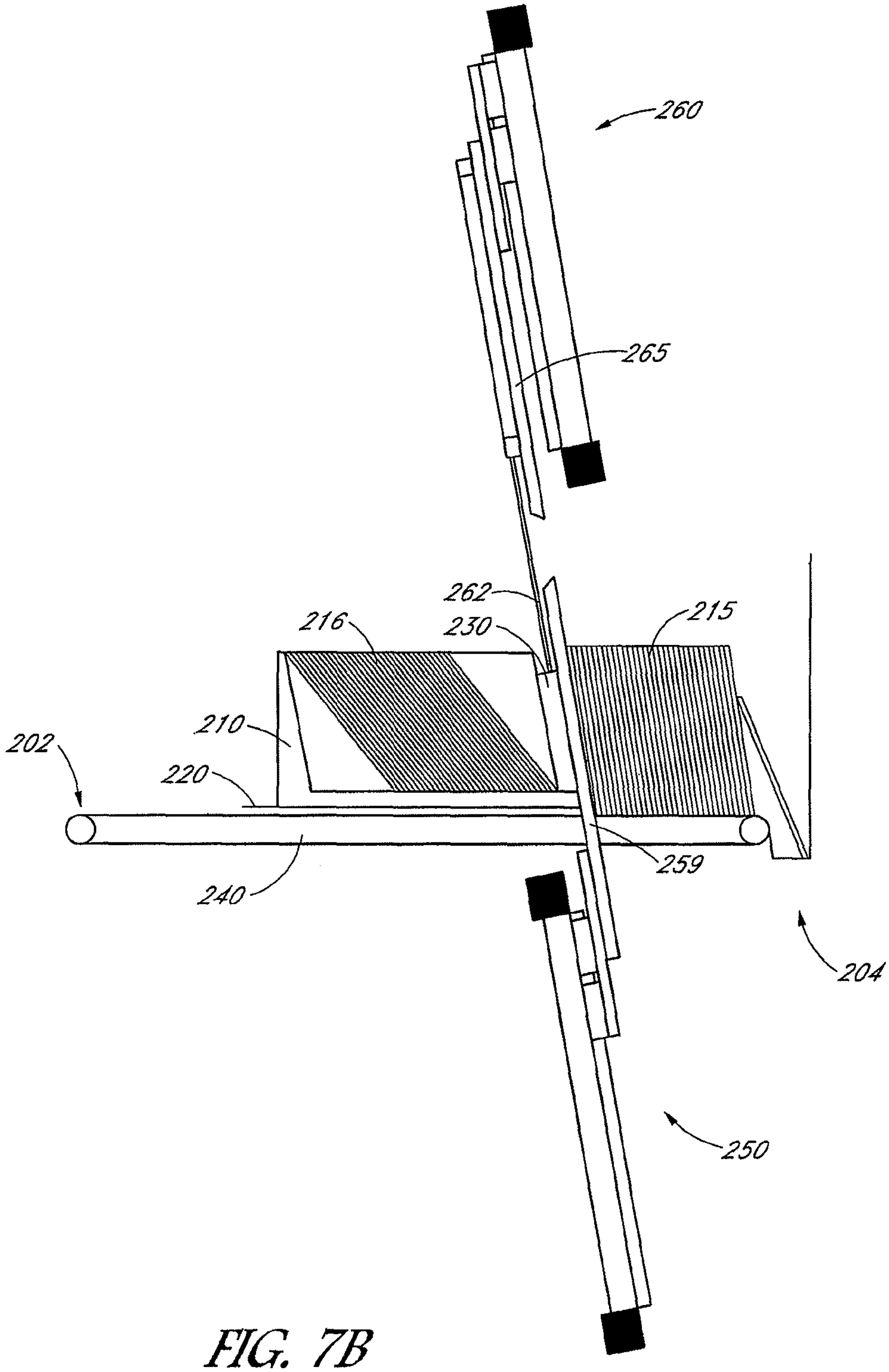

Referring now to FIG. 7B, the upper paddle 260 is positioned above the door 230 of container 210. When the container 230, which encloses the second stack 216 is placed on the belts 240, the upper paddle 260 is moved into position above the door 230, by the x-axis motor attached to the upper paddle 260. In some embodiments, the container 210 may be desirably moved on the carrier 220 along with the belts 240. The controller 610 may synchronize the movement of the carrier 220 with the belt motor 640. In order to maintain the upper paddle 260 above the door 230, the controller 610 may synchronize the x-axis motor 650, the and the carrier motor 650. This synchronization allows the paddle to stay in the correct position to open the door 230 as the container 210 is moved along by the carrier 220. When the upper paddle 260 is in position above the door 230, the controller signals z-axis motor 670 to cause the door opener 262, to extended downward and to engage the door 230 via the hook or latch or other similar mechanism on the door opener 262. FIG. 7B depicts the door opener 262 extended below the upper paddle 260 and the upper tines 265, engaged with the door 230. The door opener 262 is then retracted, vertically removing the door 230 from the container 210. As described elsewhere herein, the term vertically does not necessarily require the door to be removed straight up, but may be removed at an angle, for example, as depicted in FIG. 7B.

As described above, when the container 210 is placed on the carrier 220, the first stack of articles 215 is supported by the lower tines 259. Because the first stack of articles 215 is supported by the lower tines 259 when the door 230 is opened or removed, the first stack of articles 215 does not slump or fall into the open space in container 210.

Figure 7C:
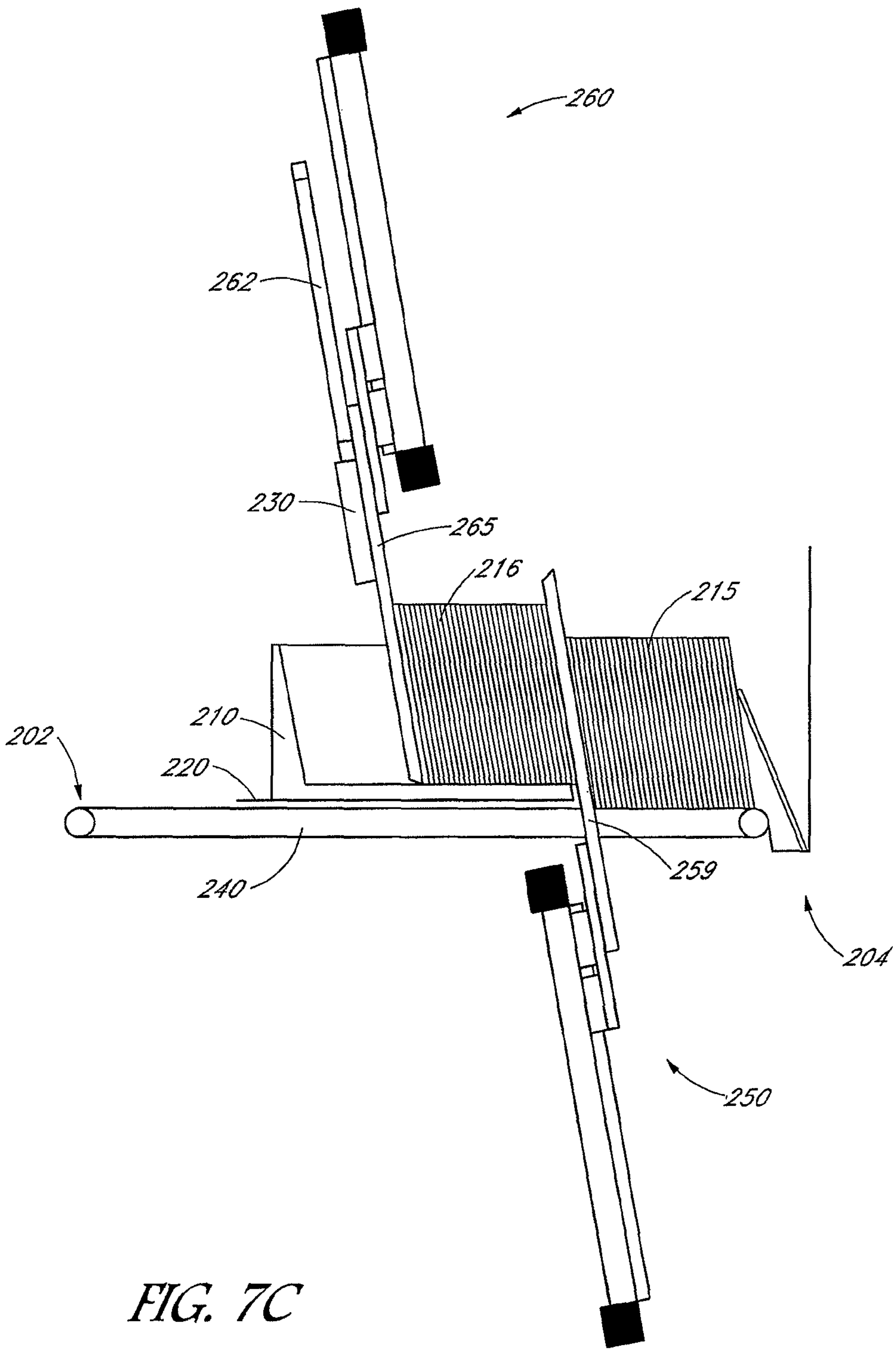

Referring now to FIG. 7C, following removal of the door 230, the controller 610 signals the x-axis motor 650 to position the upper paddle 260 behind the container 210, and then signals the z-axis motor 660 to extend the upper tines 265 downward into a position behind the container 210, which is more proximate the first end 202 of frame 201 than the container 210. The x-axis motor 650 moves the upper tines 265 forward toward the second end 204 of the frame 201, with the upper tines 265 passing through the grooves or notches 213 and into the container 210. The upper tines 265 then contact the trailing or last article in the second stack of articles 216. Once the upper tines 265 are in contact with the second stack of articles 216, the x-axis motor 650 moves the upper tines 265 forward until the upper tines 265 are providing the vertical support for the second stack of articles 216. The upper tines 265 are moved further forward in the container 210, toward the opening formed by removal of the door 230. The upper tines 265 push the second stack of articles 216 forward, causing the lead article in the second stack of articles 216 to make contact with the lower tines 259, and thus apply a stack pressure to the second stack of articles 216. The stack pressure applied by the upper tines 265 to the second stack of articles 216 is sufficient to compress the second stack of articles 216 so that upon later removal of the lower tines 259, the second stack of articles 216 will expand to fill the void left by the lower tines 259, and the resulting stack pressure, after expansion of the second stack of articles 216, will be appropriate for singulation or shingulation operations FIG. 7C depicts this stage of the container unload process, where the second stack of articles 216 is supported by the upper tines 265, and is in contact with both the upper tines 265 and the lower tines 259.

Figure 7D:
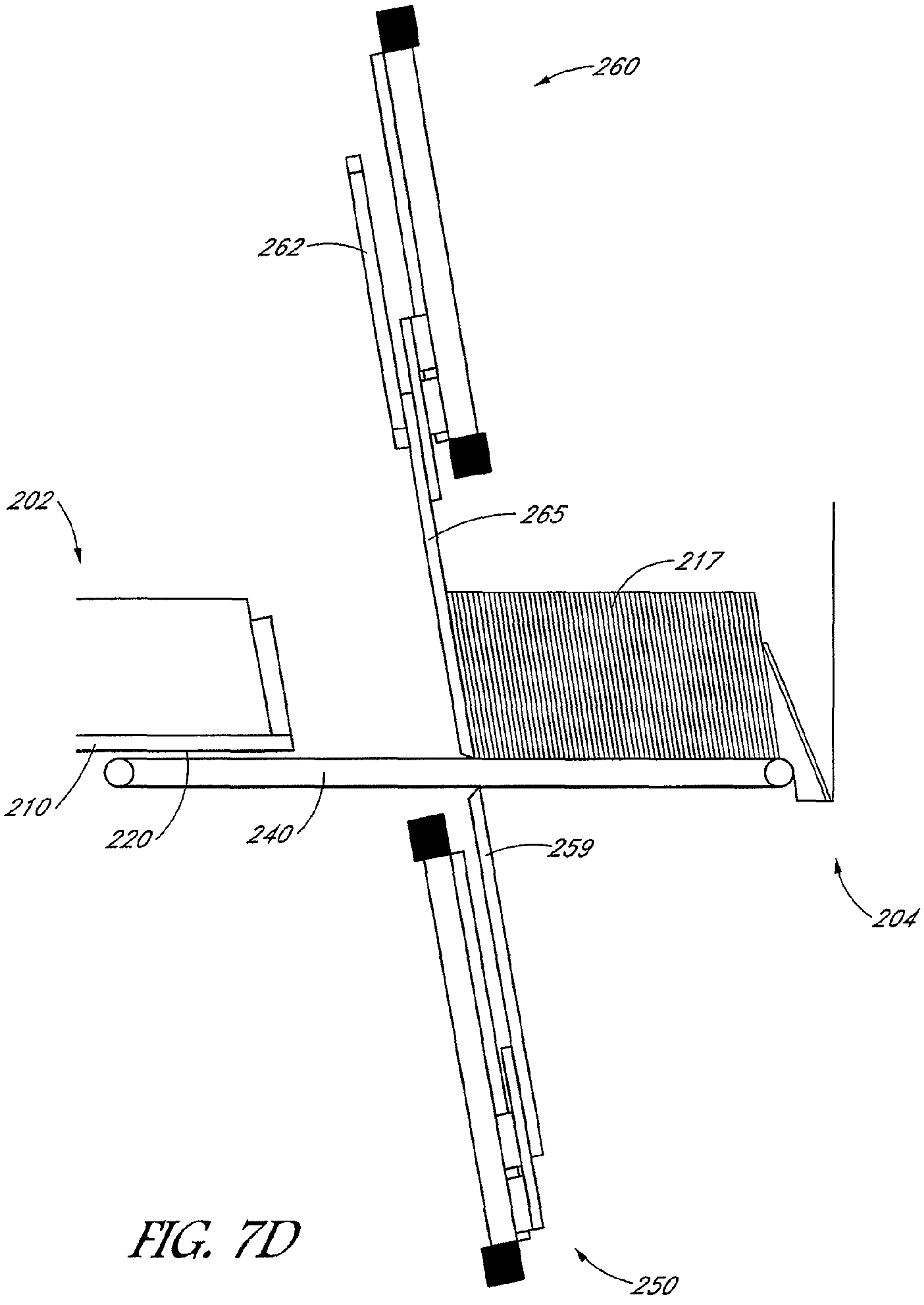

After the second stack of articles 216 is brought into contact with the lower tines 259, and the upper tines 265 apply a sufficient stack pressure to the second stack of articles 216, the carrier 220 is then moved backwards away from the second stack of articles 216, and thus, the container 210 is then withdrawn from automatic feeder 200. As the container 210 is withdrawn from the automatic feeder 200, the second stack of articles 216 contacts the belts 240. The controller 610 signals the z-axis motor 630 to retract the lower tines 259 down through the openings 242 in the belts 240. As the lower tines 259 are retracted, the stack pressure applied to the second stack of articles 216 causes the second stack of articles 216 to expand into the void left by the lower tines 259. The second stack of articles 216 and the first stack 215 are merged into a combined stack 217, vertically supported only by the upper tines 265, and the resulting stack pressure on the combined stack 217 is a stack pressure suitable for efficient and accurate singulation or shingulation. By combining the stacks of articles in this manner, a stack pressure is continuously maintained on the stack of articles throughout the container unloading process. This is depicted in FIG. 7D, which shows the lower tines 259 retracted below the horizontal surface of the belts 240 and the frame 201. The second stack of articles 216 and the first stack of articles 215 have become the combined stack 217, which is vertically supported by the upper tines 265.

To repeat the process, the controller 610 signals x-axis motor 620 to move the lower tines 259 behind the combined stack 217, and the controller 610 signals the z-axis motor 630 to extended the lower tines 259 through the openings 242 in the belts 240. The x-axis motor 620 moves the lower tines 259 forward to contact the trailing article in the combined stack 217, and the lower tines 259 mesh with upper tines 265, as described with reference to FIG. 4. Once the lower tines 259 are providing vertical support and stack pressure for the combined stack 217, the controller 610 signals the z-axis motor 660 to retract vertically the upper tines 265. The container unloading process may then be repeated.

Additional information regarding a method for unloading a container of items can be found in the appendix A attached hereto.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. An automatic stack feeder comprising:

a frame;

a plurality of belts located with respect to each other on the frame so as to define openings therebetween, the plurality of belts configured to support a container enclosing a stack of articles;

a lower support comprising lower tines extending upward from the lower support, the lower support moveably connected to the frame, wherein the lower support is moveable to partially extend through the openings between the plurality of belts, and wherein the lower support is moveable between a first end of the plurality of belts and a second end of the plurality of belts;

an upper support comprising upper tines extending downward from the upper support, the upper support configured to open the container and to supply supporting pressure to a side of the stack of articles, wherein the upper support is moveable between the first and second ends of the plurality of belts; and a controller configured to coordinate the movements of the plurality of belts, the lower support, and the upper support;

wherein the upper and lower tines are offset from each other such that the upper and lower tines mesh within the same plane, without impinging on each other.

2. The feeder of claim 1 wherein the lower support is disposed at least partially below the plurality of belts, and wherein the lower tines are axially aligned with the openings between the plurality of belts.

3. The feeder of claim 2 wherein the lower tines are connected to a drive mechanism operable to drive the tines upward through the openings between the plurality of belts.

4. The feeder of claim 1, wherein the upper tines are connected to a drive mechanism operable to drive the upper tines downward toward the plurality of belts, and operable to retract the upper tines upward toward the upper support.

5. The feeder of claim 1, wherein the upper support comprises a door opening member configured to extend downward from the upper paddle and engage a door of the container while the container is positioned on the belt assembly.

6. A system for unloading a container comprising:

a container configured to enclose a stack of articles, the container comprising a door and at least one channel formed in a side surface of the container;

a feeder comprising:

a frame having a first end and a second end, the second end comprising a singulator;

a belt assembly disposed on the frame, the belt assembly having at least one opening disposed therein, wherein the belt assembly is configured to support the container and the stack of articles, and to move the stack of articles toward the singulator;

a lower paddle disposed generally below the belt assembly, the lower paddle comprising lower tines, wherein a portion of the lower paddle is moveable through the opening of the belt assembly, and an upper paddle disposed generally above the belt assembly, the upper support comprising upper tines, at least a portion of the upper paddle being configured to extend through the at least one channel formed in the side surface of the container;

wherein the upper paddle and the lower paddle are configured to provide supporting pressure to the stack of articles when the stack of articles is on the belt assembly and wherein the plurality of upper and lower tines are offset from each other such that the upper and lower tines are configured to mesh within the same plane, without impinging on each other.

7. The system of claim 6, wherein the belt assembly comprises a plurality of parallel belts having openings disposed therebetween.

8. The system of claim 7 wherein the lower tines are aligned with the openings disposed between the plurality of parallel belts.

9. The system of claim 6, wherein at least one of the upper tines is aligned with the at least one channel formed in the side of the container.

10. The system of claim 6, wherein the upper paddle comprises a door opener configured to extend downward from the upper paddle and engage the door of the container as the container is positioned on the belt assembly.

11. The system of claim 6 wherein at least the lower paddle, the upper paddle, and the belt assembly are connected to drive mechanisms, and wherein the system comprises a controller configured to control the drive mechanisms which are respectively connected to the lower paddle, the upper paddle, the belt assembly.

12. The system of claim 11 further comprising a controller connected in communication with the drive mechanisms, wherein the controller is configured to direct the movement of the drive mechanisms.

13. The system of claim 11, wherein the drive mechanism connected to the lower paddle is operable to move the lower paddle in a first direction and a second direction.

14. The system of claim 13, wherein the first direction is generally parallel to the belt assembly, and the second direction is generally perpendicular to the belt assembly.

15. The system of claim 11 wherein the drive mechanism connected to the upper paddle is operable to move the upper paddle in a first direction and a second direction.

16. The system of claim 15, wherein the first direction is generally parallel to the belt assembly, and the second direction is generally perpendicular to the belt assembly.

17. The system of claim 12, wherein the controller is configured to synchronize the movement of the upper paddle, the lower paddle, and the belt such that the belt may move substantially continuously as the container is unloaded.

18. A method of unloading a container comprising:

operating a feeder, the feeder comprising:

a frame having a first end and a second end, the second end comprising a singulator;

a belt disposed on the frame, the belt having an opening therein, wherein the belt is configured to move an article toward the second end and into contact with the singulator;

an upper paddle disposed above the belt;

a lower paddle moveably connected to the frame and disposed at least partially below the belt;

extending at least a portion of the lower paddle upward through an opening disposed in the belt, at a location more proximal to the second end of the belt than the location of the container;

receiving a container enclosing a stack of articles onto the first end of the belt, wherein the container comprises a door and a rear surface with at least one channel formed therein;

opening the door of the container using the upper paddle, wherein the upper paddle is moveable between the first end and the second end of the feeder;

moving at least a portion of the upper paddle through the channel in the rear surface of the container;

supporting the stack of articles in the container with the portion of the upper paddle; and moving the upper paddle toward the second end of the feeder, thereby pushing the stack of articles through the door of the container, and impinging a lead article in the stack of articles against the portion of the lower paddle which extends above the belt;

removing the container from the feeder while leaving the stack of articles sandwiched between the upper paddle and the lower paddle;

withdrawing the lower paddle through the opening disposed in the belt;

advancing the stack of articles toward the singulator using the belt and supporting the stack of articles with the at least a portion of the upper paddle.

19. The method of claim 18, wherein the portion of the lower paddle extending above the belt supports a second stack of articles prior to receiving the container on the first end of the belt.

20. The method of claim 19, wherein withdrawing the lower paddle comprises merging the stack of articles from the container and the second stack of articles into a single stack of articles.

21. The method of claim 18 further comprising synchronizing the movement of the lower paddle and the belt such that the stack of articles is maintained at approximately the same angle relative to the belt as the stack of articles moves toward the second end of the feeder.

22. The method of claim 21 further comprising synchronizing the movement of the upper paddle with the movement of the belt and the lower paddle such that the steps of opening the container and supporting the stack of articles in the container are performed without altering the movement of the belt.

* * * * *